US005080701A

United States Patent [19]

Howard et al.

[11] Patent Number: 5,080,701

[45] Date of Patent: Jan. 14, 1992

[54] PORTABLE DECONTAMINATION UNIT FOR SPOT ABATEMENT OF ASBESTOS OR SIMILAR CONTAMINANTS

[75] Inventors: Darrell W. Howard; Cecil L. Sayer, both of Laveen, Ariz.; Thomas Dibenedetto, Murietta, Calif.; Sam J. Sherrard, Mesa, Ariz.

[73] Assignee: Commercial Decontamination, Inc., Glendale, Ariz.

[21] Appl. No.: 630,226

[22] Filed: Dec. 19, 1990

[51] Int. Cl.[5] .............................................. B01D 50/00

[52] U.S. Cl. .......................................... 55/356; 55/97; 55/385.1; 55/472; 55/DIG. 3; 134/111; 134/201

[58] Field of Search ..................... 55/96, 97, 318, 356, 55/385.1, 385.2, 472, 500, DIG. 3; 134/110, 111, 201

[56] References Cited

U.S. PATENT DOCUMENTS 4,682,448 7/1987 Healey ........................ 55/DIG. 3 X
4,765,352 8/1988 Strieter ................................ 55/97 X
4,774,974 10/1988 Teter .................................. 134/110
4,787,922 11/1988 Kulitz .............................. 55/356 X
4,911,191 3/1990 Bain ............................... 134/201 X
4,979,967 12/1990 Walter et al. ..................... 55/356 X

*Primary Examiner*—Charles Hart
*Attorney, Agent, or Firm*—Fitch, Even, Tabin & Flannery

[57] ABSTRACT

A self-contained, portable spot abatement unit (10) facilitates the spot removal or abatement of asbestos material, or other material containing particulate contaminants. The unit includes a portable work chamber (12) having vacuum (VP1, VP2) and filtration (F1, F2) means coupled thereto for establishing a negative air pressure therewithin. The unit has overall dimensions that permit easy passage through conventional door openings, yet the work space provided within the work chamber is sufficiently large to allow a worker to perform whatever tasks need to be performed at a desired work site. A first telescoping top frame (20, 52) allows the work chamber to expand in order to contact finished ceilings up to 13 feet from a finished floor. A second telescoping frame (22, 56) used in one embodiment, allows the work space to be further extended, e.g., to pass through an opening (54) in a finished ceiling up to 18 feet from the finished floor. A hand-held collection bag (144) may also be used within the work chamber. The extended work space provides a negative air pressure volume wherein work may be performed from finished floor to a contamination site (i.e., a site where contact with asbestos or similar materials is made). Suitable negative air machines mount beneath the unit and couple the outside air to the sealed work chamber through a manifold so that all air must exit the work chamber through appropriate filters adapted to capture all asbestos or other contaminate fibers.

12 Claims, 6 Drawing Sheets

PORTABLE DECONTAMINATION UNIT FOR SPOT ABATEMENT OF ASBESTOS OR SIMILAR CONTAMINANTS

BACKGROUND OF THE INVENTION

The present invention relates to apparatus and methods used in the abatement of asbestos or similar materials containing particulate contaminants in a small work area. More particularly, the present invention relates to portable apparatus that allows spot abatement of asbestos or similar materials without significantly disrupting or disturbing other areas surrounding the small work area where the abatement is occurring. Additionally, the apparatus allows access above ceilings into contaminated areas for inspection and normal maintenance operations.

Asbestos is a naturally occurring, fibrous, magnesium silicate mineral that had, up until only a few years ago, been frequently used for thermal insulation. Asbestos exhibits remarkable thermal insulation and fire-proofing properties. Unfortunately, air-borne fibers and other particles of asbestos have proven to be a major lung irritant capable of causing the serious and debilitating disease known as asbestosis among chronically exposed workers, as well as a type of cancer known as mesothelioma.

As a result of the potential health hazard associated with handling asbestos, or similar materials that include particulate contaminants, there has been in recent years a concerted effort to remove or abate asbestos from or in buildings or other structures that have utilized asbestos as an insulating material. Many regulations have been adopted and are in place to ensure the safety of workers who remove asbestos, or other personnel in the vicinity of a work area where asbestos removal is occurring, as well as to ensure that the asbestos being removed is not introduced into the surrounding atmosphere.

U.S. Pat. No. 4,604,111, for example, describes a fairly common system which is employed in an asbestos removal project. As described in the '111 patent, and as is commonly practiced, before asbestos can be removed, an enclosure must be created around the space in which the asbestos is to be removed. The space is sealed by means of plastic sheets or the like. An air inlet is provided for the enclosed space to permit air to be drawn thereinto. A suitable filtration unit is then employed that provides an air outlet. The air outlet of the filtration unit is placed in communication with the area outside of the enclosed space. A blower, or equivalent device, is provided in the filtration unit so that the contaminated air in the enclosed space is drawn through the filtration unit with the asbestos fibers being collected in the filtration unit. In this way, the filtration unit creates a "negative air system" that assures that all of the air in the enclosed space is under pressure to leave the enclosed space. As the air can only leave through the air outlet, all of the air must thus pass through the filtration unit, where the dangerous asbestos fibers are collected.

When the health hazards associated with asbestos materials were first identified, there was an intensive effort to remove all asbestos-containing materials from any buildings or other structures where the asbestos was found to exist. Such efforts proved to be very expensive and labor-intensive, and (with the benefit of hindsight) an over-reaction to a problem that could be addressed through simpler and less expensive means. As a less-expensive alternative to asbestos removal, for example, it was discovered that an effective asbestos monitoring and maintenance program could achieve the same desired goal --preventing the hazardous asbestos fibers from becoming airborne and coming in contact with any personnel within or around the structure where the asbestos materials have been used. Asbestos monitoring and maintenance thus involves sealing or encapsulating the asbestos material in a suitable film, e.g., by spraying or otherwise coating the asbestos materials with an appropriate encapsulating substance (termed an "encapsulant"). The resulting film, or equivalent sealer or encapsulant, in combination with the structure wherein the asbestos is located (e.g., the ceiling or walls) thus effectively encapsulates the asbestos fibers and prevents them from becoming airborne. Hence, asbestos monitoring, maintenance and encapsulation procedures (AMMEP) advantageously allow the health hazard associated with the presence of asbestos to be minimized, at a much reduced cost over asbestos removal. Further, such AMMEP avoid the problems of handling and disposing the asbestos materials, which problems are always present whenever asbestos materials are removed. AMMEP further offer the advantage of allowing the asbestos materials to continue to provide their insulating and fireproofing properties. Hence, AMMEP (as opposed to asbestos removal) has proven to be a preferred approach for dealing with the hazardous asbestos materials that were commonly used in the building and construction industry prior to about 1978, before asbestos was known to pose any health hazard.

Unfortunately, AMMEP does not eliminate all health concerns. It is sometimes necessary to do remodeling or other construction modifications in a building or structure wherein AMMEP have been and are being utilized. When such remodeling or other construction modifications are necessary, the same care must be exercised as is used during asbestos removal, even though the area affected by the remodeling or construction modification may comprise only a small area or "spot" of the overall area within a building.

Heretofore, when spot entry into areas containing asbestos materials has been required, e.g., to do remodeling, to retrofit sprinkler or electrical systems, or to perform other modifications, one of two approaches would be pursued. A first approach requires the entire evacuation of the overall work area wherein the work is to be performed, e.g., an entire floor, or an entire building, with a suitable enclosure and negative air pressure system being established for the overall work area. This approach is very disruptive to the occupants of the work area, as they must completely evacuate the area while the work is being performed, even though only small areas of the overall work area are affected by the actual work. However, depending upon the number of small work areas that are to be involved, this approach is still frequently used.

A second approach requires the evacuation of just the immediate area surrounding the structure where the spot entry is to be made. A suitable enclosure is erected around the small area and a negative air pressure system is established within the enclosure. The enclosure must seal off the area to be affected, from finished floor to finished ceiling, and is typically realized using polyethylene sheeting, supported by appropriate scaffolding support structure. While this approach avoids the necessity of evacuating the entire overall area, as is required with the first approach described above, it requires continual erection and disassembly of the enclosure structure around each spot area where the work is to be performed. Thus, when the retrofit or other work is finished in one area, and further retrofit or work is required in another area, it is necessary to disassemble and take down the enclosure structure, move to the next work area, and seal the new area in the same manner. Disadvantageously, this approach takes a great amount of time and materials, thereby making spot retrofit or remodeling work in an area having asbestos materials very labor intensive.

U.S. Pat. No. 4,682,448 describes a system designed to minimize some of the labor-intensive aspects of this second approach. Disclosed in the '448 patent is a system that includes a work cubical that is erected on a mobile base. The walls of the cubical are made from a flexible material that includes zippers to allow entry of work personnel thereinto. An external filtration and pump unit is then connected to the system to establish a negative air system. Thus, the cubical can be moved from one spot to another within the same general area without disassembly, so long as the cubical does not need to pass through a low door, and so long as the external filtration unit is connected to the cubical at each work location. However, disassembly is still required when the cubical is moved through low doorways, and the external filtration unit must be disconnected and reconnected each time the cubical is moved. Further, in the event of a major "falldown" of asbestos materials into the cubical, as sometimes occurs when performing remodeling or inspection in a contaminated area, there is no easy way to transfer the cubical, and the personnel inside of the cubical, to a "clean room" or large decontamination area. Rather, the personnel must exit the cubical, thereby causing a potential release of contaminating fibers into the surrounding area.

In view of the above, it is evident that what is needed is a system for performing spot abatement of asbestos, including asbestos monitoring, maintenance, and encapsulation procedures, that provides all the safety precautions commonly utilized when working with or handling asbestos materials, e.g., creating a negative air pressure region around a given work site, without the disruptive effects experienced using the first approach described above, and without the time consuming, labor-intensive disassembly and reassembly tasks of the second approach described above. Further, what is needed is a system that can handle asbestos "falldown", should it occur, in a safe and effective manner. The present invention advantageously addresses these and other needs.

SUMMARY OF THE INVENTION

In accordance with one aspect of the present invention, a self-contained, portable spot abatement unit is provided that facilitates the spot removal or abatement of asbestos material, or other material containing particulate contaminants, as well as other types of monitoring, maintenance and encapsulation procedures. Spot removal or abatement is frequently required for the retrofit of, e.g., fire sprinkler systems, alarm systems, electrical systems, or other systems that require entry into a ceiling, wall, or other area of a structure containing asbestos materials. Advantageously, the unit of the present invention is completely self-contained and portable, and includes blower and filtration means for establishing a negative air pressure within a sealed work space or volume within the unit. Because the unit is portable, it can readily be placed in a desired area where retrofit or similar work is to be performed.

In accordance with another aspect of the invention, the portable spot abatement unit has overall dimensions that permit easy passage through conventional door openings, yet the work space provided within the unit is sufficiently large to allow a worker to perform whatever tasks need to be performed at the work site. A telescoping top frame allows the work space to expand in order to contact finished ceilings up to 13 feet from a finished floor. Additionally, a second telescoping frame allows the work space to be further extended, e.g., to pass through an opening in a finished ceiling up to 18 feet from the finished floor. This extended work space thus provides a sealed negative air pressure volume wherein work may be performed from finished floor to a contamination site (i.e., a site where contact with asbestos or similar materials is made). Suitable negative air machines mount beneath the unit and couple the outside air to the sealed work space through a manifold such that all air must exit the work space through appropriate filters designed to capture all asbestos or other contaminate fibers. Further, the unit is sufficiently structurally sound to allow the entire unit, including the personnel inside of the unit, to be covered and moved to a decontamination area in the event of an asbestos falldown. In such event, cleaning of the unit is facilitated by a washdown procedure, using a drain located in the floor of the unit, which drain may be connected to a suitable filter, as required.

In use, when remodeling or retrofit is required in a small area, the unit is simply wheeled to the area where the work is to be done. The unit telescopes to the proper dimensions in order to make contact with the work area, and a negative air pressure is established within the work space. The work is then performed by a worker within the interior work space in conventional manner. When the work is completed, the unit is simply retracted and moved to a new location. As indicated, cleaning of the interior work space is facilitated through the use of a floor drain which is connected to a suitable filter.

One embodiment of the invention may be characterized as a self-contained, portable, spot abatement apparatus. Such apparatus includes: (1) a work chamber having a floor, walls, and an entry door, the work chamber being sufficiently large to enable a person to work therein; (2) extension means for selectively extending the dimensions of the work chamber; (3) means for establishing a negative air pressure within the work chamber, the negative air pressure means including a filter system through which all of the air exiting the work chamber must pass; and (4) wheels attached to the work chamber to facilitate moving it to a desired work site. In use, such apparatus can advantageously be wheeled to the desired work site beneath a work area containing materials having particulate contaminants, such as asbestos. The work chamber is then extended to effectively place the work area within the work chamber. The work is then performed at the work area from inside of the work chamber, and any particulate contaminants dislodged from the materials while performing the work are captured in the filter system.

Another embodiment of the invention may similarly be characterized as portable apparatus for facilitating the spot abatement of asbestos or like materials. Such portable apparatus includes: (1) a work chamber mounted on wheels, this work chamber having a floor and walls, the walls including a rigid fixed portion and a flexible adjustable portion, and a door being located in the rigid fixed portion of one of the walls, and the work chamber being sufficiently large to allow a worker to work therein; (2) adjustment means for adjusting the height of the flexible portion of the walls so that the overall height of the walls may be selectively adjusted to extend up to a work surface, such as a ceiling, where spot abatement is to be performed; and (3) means for creating a negative air pressure within the work chamber.

The invention further includes a method of performing spot abatement of asbestos or a similar materials. Such method comprises the steps of: (a) wheeling a portable work chamber beneath a work location whereat spot abatement is to be performed, this portable work chamber being sufficiently large to allow a person to work therein, where the portable work chamber has a floor and walls, and where the walls have an adjustable height; (b) extending the height of the walls to contact the work area; (c) establishing a negative air pressure within the work chamber, and ducting all the air exiting the work chamber through a collection filter; (d) performing specified work at a particular spot within the work area from inside of the work chamber while the negative air pressure is established therein; and (e) coating the area where the specified work is performed in step (d) with an asbestos sealant, this coating likewise being performed from inside of the work chamber while the negative air pressure is established therein. Thus, using this method the asbestos may be abated at the particular spot whereat the work is performed. Once the work is completed at a first spot, the walls of the work chamber are lowered, and the work chamber is wheeled to a new location where the steps may be repeated. In this fashion, work is readily performed at a plurality of spot locations with minimum disruption to the surrounding areas.

It is thus a feature of the invention to provide spot abatement apparatus that is portable and easy to move from one location to another.

It is another feature of the invention to provide such portable apparatus that readily fits through conventional door openings, thereby avoiding the necessity to disassemble the apparatus when moving it from one work location to another.

It is a further feature of the invention to provide a portable apparatus that is sufficiently strong to allow it to be moved, when necessary (such as in the event of asbestos falldown), with personnel remaining inside thereof, to a safe location where decontamination can take place, even when such movement must be through door openings or elevators.

It is an additional feature of the invention to provide such portable apparatus that is totally self-contained, including all the tools and components needed to safely perform spot abatement of asbestos from within such apparatus, such as filtration and pump units to establish a negative air pressure within the apparatus as work is performed therein.

It is yet another feature of the invention to provide such portable apparatus that has an adjustable height, whereby a work chamber having a negative air pressure may be readily created for varying floor-to-ceiling heights. A related feature, in one embodiment of the invention, provides means for two separate telescoping extensions of the work chamber walls, thereby allowing a first extension up to a first ceiling, such as a false ceiling, and a second extension up above the false ceiling to an area where the actual work is performed. Another related feature, in another embodiment of the invention, provides a debris collection bag having a negative air pressure therein, which collection bag may be manually positioned immediately beneath a work area, such as above a false ceiling, where contaminants may fall as a result of remodeling, inspection, or other activities being carried out in the work area.

It is still a further feature of the invention to provide an efficient system and method for the monitoring, maintenance and/or encapsulation of asbestos or similar materials (hereafter "spot abatement" or "abatement") that can be performed with a minimum of disruption to a facility or structure where the spot abatement is to be performed, or to the personnel housed within such facility or structure.

It is also a feature of the invention to provide an apparatus and method that facilitates the remodeling of a structure having asbestos material, or the retrofitting or repairing of various systems (such as sprinkler systems) within a structure having asbestos material.

BRIEF DESCRIPTION OF THE DRAWINGS

The above and other aspects, features and advantages of the present invention will be more apparent from the following more particular description thereof, presented in conjunction with the following drawings wherein.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
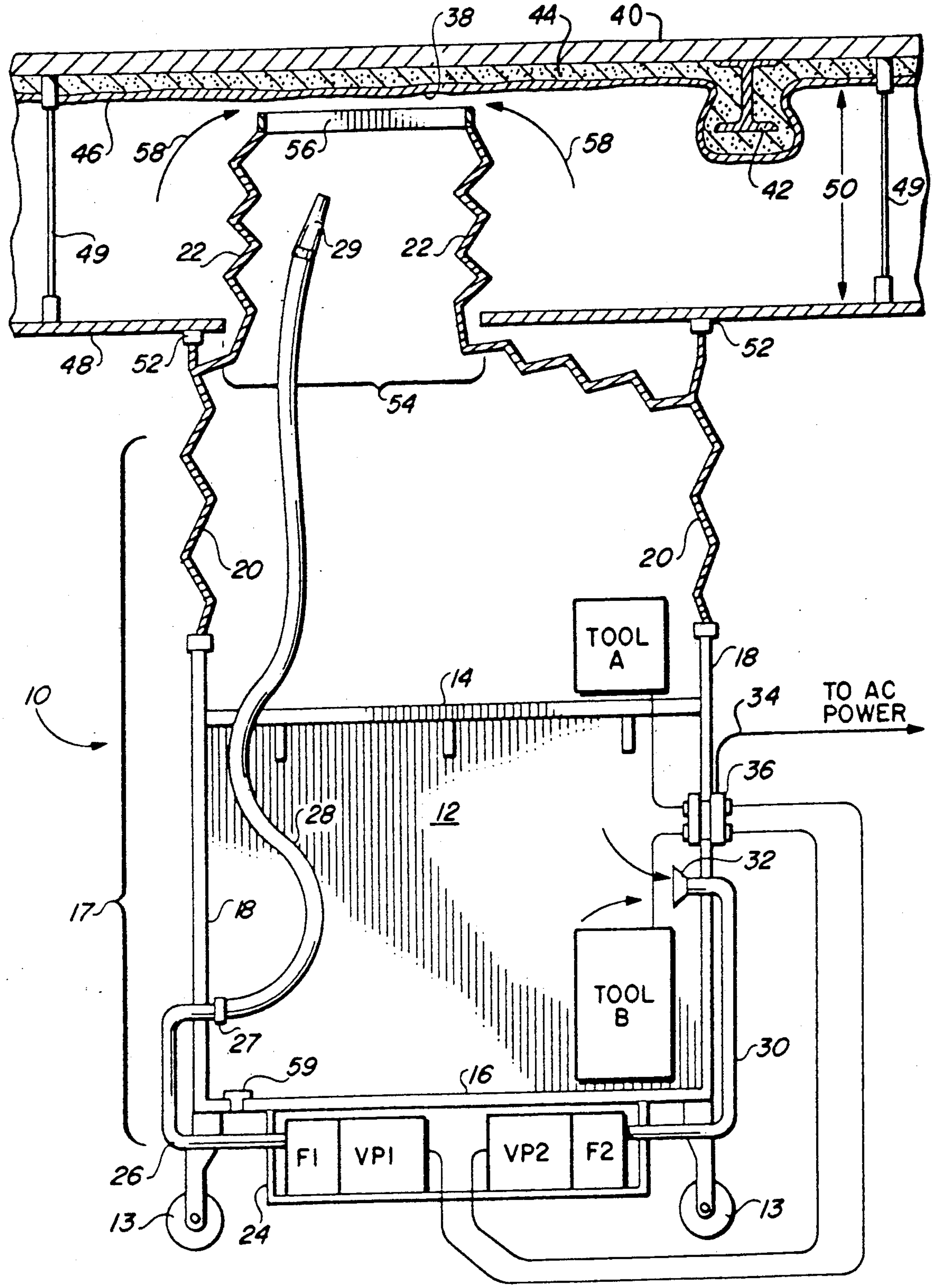
FIG. 1 is a schematic diagram of the portable spot abatement apparatus of the present invention.

Referring first to FIG. 1, there is shown a schematic diagram of a portable spot abatement unit 10 made in accordance with the present invention. The unit 10 includes a work section or chamber 12 mounted on wheels 13. A scaffold shelf or plank 14 is mounted within the chamber 12 to provide a surface upon which a worker may stand. The work chamber 12 includes a floor 16 and side walls 17. The side walls 17 are made up of a rigid portion 18 and a first flexible extendable portion 20. In one embodiment of the unit 10, the walls 17 further include a second flexible portion 22 that may be selectively extended beyond the extension range of the first extendable portion 20. In still another embodiment of the unit 10, a worker positioned inside of the chamber 12 may use a hand-held collection bag that is manually positioned immediately underneath the work site. The collection bag, shown below in FIG. 7, has a negative air pressure established therein.

Figure 7:
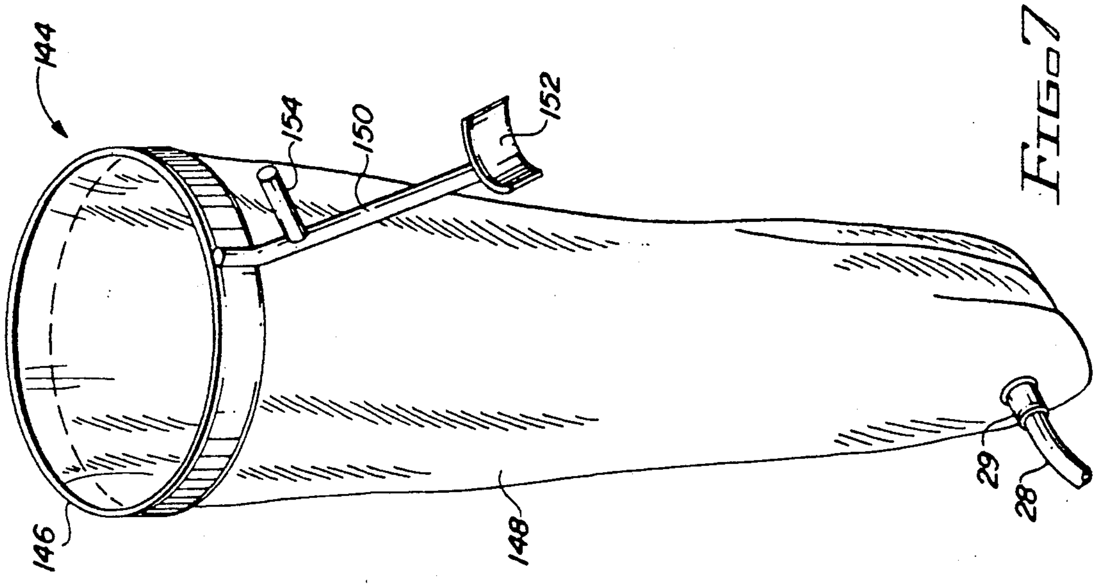
FIG. 7 shows a hand-held collection bag wherein a negative pressure is established that may be used by personnel working within the work chamber of the present invention.

The unit 10 further includes an equipment tray 24 mounted below the floor 16. The equipment tray 24 carries at least one air pump connected to establish a negative air pressure within the work chamber 12. As shown in FIG. 1, two air pumps are preferably utilized for this purpose. A first air pump VP1, e.g., a vacuum pump, draws air through a first filter F1 and vents this air external to the work chamber 12. The air drawn into the filter F1 is pulled through an air duct 26 from a nozzle port 27 located inside of the work chamber 12. For many applications, a flexible hose 28 may be connected to the nozzle port 27, thereby allowing a worker to manually position a tip 29 of the hose 28 at a desired work location within the chamber whereat a vacuum cleaning is desired. When the collection bag, shown below in FIG. 7 is used, the tip 29 of the hose 28 may be inserted into the bag in order to establish a negative pressure therein. A second air pump VP2 similarly draws air through a second filter F2 and vents this air external to the work chamber. The air drawn into the filter F2 is pulled through an air duct 30 from a nozzle port 32 located inside of the work chamber 12.

Also included as part of the unit 10 is an electrical distribution system. This electrical distribution system includes an input power cord 34 that is connected to a conventional AC power source. The input power cord 34 is connected to a ground fault interrupt (GFI) circuit 36. The GFI circuit 36 includes conventional receptacles accessible from locations both internal and external to the work chamber 12. As shown in FIG. 1, the air pumps VP1 and VP2 are preferably plugged into the externally accessible receptacles, while different power tools, shown generically in FIG. 1 as Tool A and Tool B, are plugged into the internally accessible receptacles. A worker within the chamber 12 can thus utilize Tool A and/or Tool B to assist with whatever work is being performed from within the unit 10.

As explained below, the unit 10 advantageously allows work to be safely performed at a desired work site 38 located on the underneath side of a deck 40 that has been coated with a layer 44 of asbestos (or similar material) for fire-proofing and/or insulation purposes. The deck 40 typically forms part of the structure of a building, and is usually supported by a plurality of I-beams 42 (or equivalent). For building structures constructed prior to about 1978, it is quite common for the underneath side of the deck 40 to be coated with the asbestos layer 44. The layer 44 was used for fire-proofing purposes. However, in recent years, in order to minimize any potential health hazard associated with the asbestos layer 44, the layer 44 has typically been sealed in an encapsulating layer 46. A false ceiling 48, typically comprising, e.g., 4′×2′ sections of acoustical tile supported by hangers 49, typically hangs below the deck 40. The space 50 between the false ceiling 48 and the underside of the deck 40 is frequently referred to as the "deck space".

When work is to be performed at the desired work site 38, e.g., in order to mount a hanger to the deck 40 to support a sprinkler system, it is necessary to penetrate the encapsulant 46 and the asbestos layer 44 at the work site 38, perform the desired work, and then re-encapsulate the area affected. This process is referred to generally as "spot abatement", and must be performed in accordance with strict standards imposed by the United States Environmental Protection Agency under the Asbestos Hazard Emergency Response Act (AHERA). (It is to be understood, as previously indicated, that "spot abatement", as used herein, may refer to any of the activities undertaken to monitor, maintain, remove, repair, renovate, recondition, replace, pass through, and/or encapsulate asbestos or similar contaminant-containing materials.) Advantageously, such spot abatement is greatly facilitated by use of the portable unit 10.

The method of using the unit 10 (or equivalents of the unit 10, such as the units 10′ or 10″ described below in connection with FIGS. 3-7) is summarized in the flow chart of FIG. 2. Reference numerals in the description that follows relate to FIG. 1, except for references to the specific steps outlined in FIG. 2 (which steps are referred to as a specific "block" of the flow chart by a parenthetical reference to a block number in FIG. 2).

After beginning the method (block 150 in FIG. 2), a first step involves wheeling the unit 10 beneath the desired work site 38, with the flexible portions 20 and 22 of the work chamber walls 17 in a retracted, or lowered, position. While in such position, the overall dimensions of the unit 10 allow it to readily fit through conventional door openings, thereby facilitating placement of the unit 10 at any desired work location. Once beneath the desired work site, the wheels are locked, and the flexible portion 20 of the chamber walls is extended (block 154) so that a rim 52 around the perimeter of the upper portion of the flexible walls 20 contacts the false ceiling 48. A worker then enters the chamber through a door (not shown in FIG. 1, but shown below in FIG. 3) located in the fixed portion 18 of one of the work chamber walls 17. Once inside of the chamber 12, and with the walls 20 extended to contact the ceiling 48, and with the door closed, at least one of the pumps VP1 or VP2 is activated (block 156) to establish a negative air pressure within the chamber. The worker then makes an opening 54 in the false ceiling 48 (block 158). Typically, this is done simply by removing an acoustical tile in the false ceiling. Advantageously, the rim 52 around the perimeter of the flexible extendable wall portion 20 is preferably sized to be slightly larger than a conventional 4′×2′ ceiling tile. Once the opening 54 is created, the worker may manually clean in and around the opening using the nozzle 29 of the hose 28 as a vacuum.

Once the opening 54 has been established from inside of the unit 10, the work chamber walls may be further extended up into the deck space 50 as required, using the flexible wall portion 22 (block 160). Alternatively, a hand-held collection bag, having a negative pressure established therein, may be extended up into the deck space 50 so as to be positioned immediately below the desired work area. Preferably, this extension or placement places a rim 56, connected around the upper edge of the flexible wall portion 22, or connected around the upper edge of the collection bag, to within a few inches of the work site 38. With the upper edge of the work chamber or collection bag walls thus positioned, all of the air drawn into the work chamber 12, by action of the pumps VP1 and/or VP2, is pulled through the narrow opening between the rim 56 and the lower edge of the deck 40, as shown by the arrows 58. This assures that a negative air pressure is maintained within the chamber 12. It further assures that any asbestos particulates dislodged while working at the work site 38 are pulled into the chamber 12 and do not escape into the deck space 50. Such particulates are eventually captured in the filter F1 or the filter F2.

The worker then performs the specified work at the work site (block 162) using his hands and/or whatever other tools may be required. It is noted, of course, that the worker is protected while in the work chamber by wearing suitable protective clothing and masks, either half face or full face. As the specified work is performed at the work site 38, e.g., using Tool A or Tool B or other tools, the nozzle 29 is preferably positioned proximate the work site 38. Thus, e.g., as a hole is drilled through the encapsulating layer 38 and into the asbestos layer 44, all of the shavings from the drilling action are sucked into the nozzle 29. Similarly, as other work is performed at the site 38, e.g., as a hanger is mounted to the underside of the deck by a suitable fastener passing through the hole of the asbestos layer 44, any other asbestos particulates that might be dislodged, are also sucked into the nozzle 29.

Should a "falldown" condition occur, i.e., should a sizeable piece of asbestos or similar material become dislodged while the worker is performing the desired activity, such piece will fall either into the collection bag, if used, or into the main portion of the work chamber. In either event, such "falldown" condition need not be of major concern. If falldown occurs, the worker inside of the chamber is protected by protective clothing. A cover is simply placed over the top of the chamber, the extended walls are lowered, and the entire unit, including the worker therein, may be wheeled to an appropriate decontamination site, where both the worker and the unit may be appropriately cleaned using conventional decontamination procedures.

Once the work has been completed at the work site 38 (block 164), the nozzle 29 may be used by the worker to thoroughly clean in and around the work site 38 (block 166). A suitable encapsulant is then sprayed in and around the work site to seal the asbestos layer 44 (block 168). Such encapsulant may be applied using, e.g., an electric or manual sprayer that is kept within the work chamber 12. Suitable encapsulating materials are known in the art, and any may be used for this purpose. For example, SK-13 available from National Cellulose Corp, of Houston, Texas; or OCEAN 666, available from Ocean Chemicals, Inc., or Savannah, Ga., may be used. Such encapsulant cures in just a few minutes, thereby securing the work site 38.

With the work site 38 secured, the flexible wall portion 22 is retracted (block 170) and the hole 54 in the false ceiling is closed (block 172). If the work in the deck space 50 is completed, the hole 54 may be finally enclosed, e.g., by replacing the ceiling tile. If the work is not yet completed, e.g., as when only a hanger has been installed at the work site, but sprinkler pipes still need to be secured to the installed hangers, then the hole 54 may be temporarily enclosed, such as by closing the hole with a clear plastic film lens.

With the hole 54 closed, the pumps VP1 and/or VP2 are turned off (block 174), and the flexible wall portion 20 is lowered (block 176). The unit 10 may then be wheeled to the next location where work is to be performed, and the process is repeated. Periodically, e.g., once or twice a day, the interior of the work chamber 12 is cleaned by vacuuming and/or washing. A drain plug 59 located in the floor 16 of the work chamber 12 facilitates such cleaning.

Figure 2:
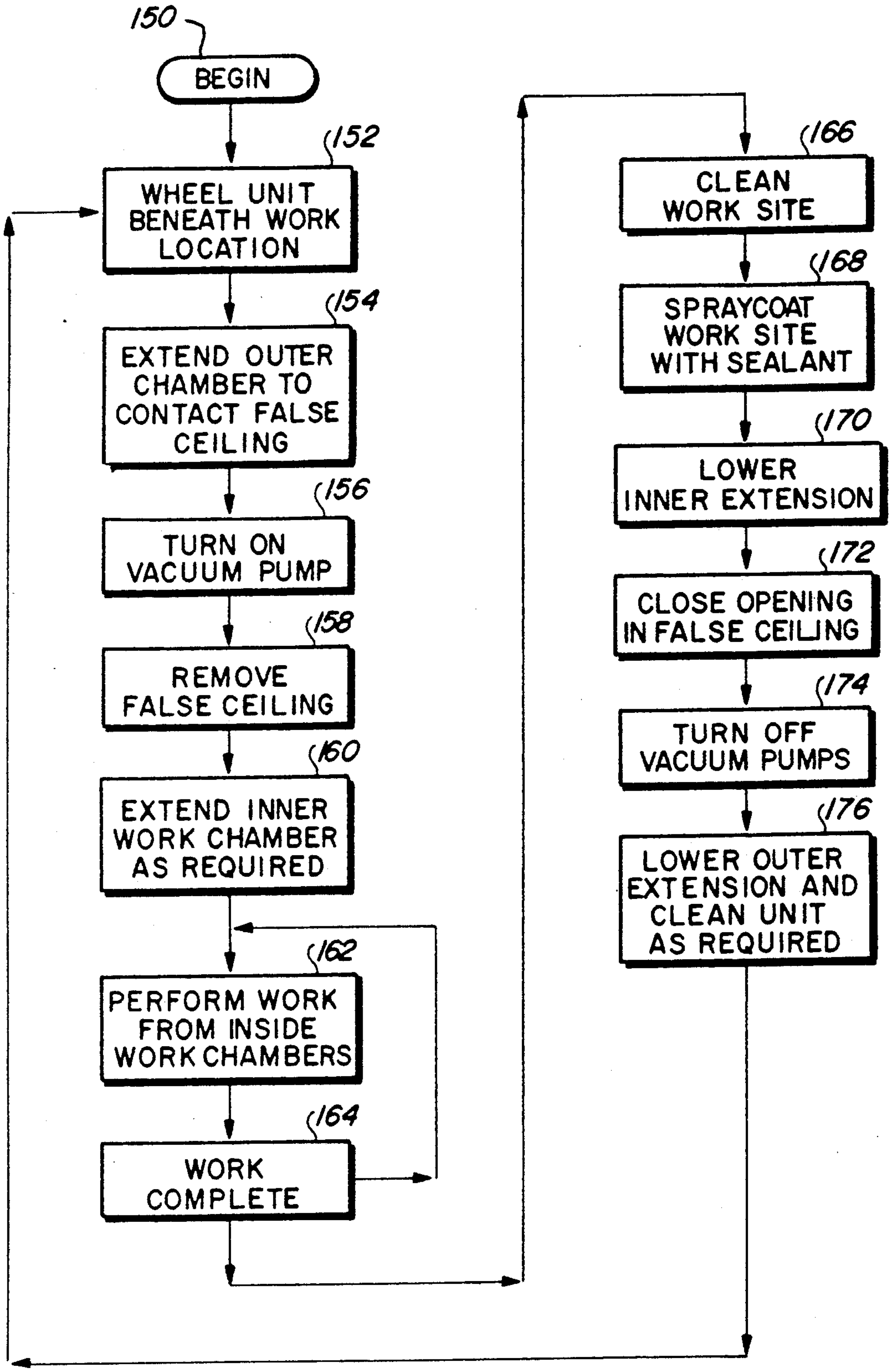
FIG. 2 is a flow chart depicting the steps utilized in carrying out the spot abatement method of the invention using the apparatus of FIG. 1.

It is noted that the method depicted in the flow chart of FIG. 2 is only exemplary of the general steps that might be followed in a typical spot abatement procedure. The actual steps that are followed for any given task are suited to the particular job, and are carried out in compliance with any applicable regulations. These steps may or may not be the same as those outlined in FIG. 2.

Figure 3:
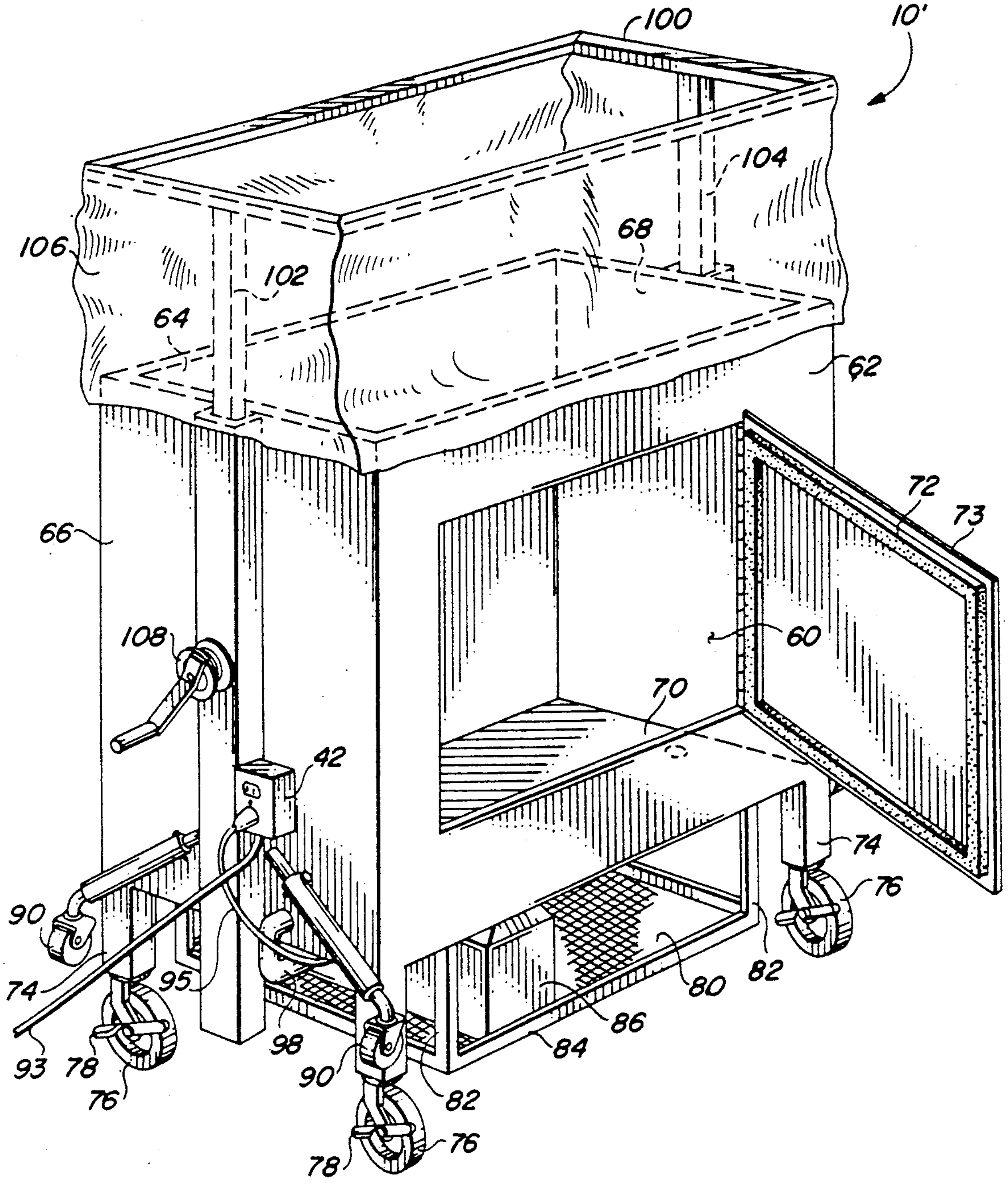
FIG. 3 is a perspective view of one embodiment of the portable spot abatement apparatus of the invention.

Referring next to FIG. 3, a perspective view of one embodiment of a portable spot abatement apparatus 10' made in accordance with the present invention is shown. The apparatus 10' includes a work chamber 60 having a rigid front wall 62, a rigid back wall 64, and rigid side walls 66 and 68. A floor 70 joins the walls 62, 64, 66 and 68 at the respective lower edges thereof. A door 72 is mounted in a door opening located in the front wall 62. This door includes latching means (not shown), including a seal 73 around its edge, to allow the door to be shut to seal and close the door opening. The work 60 is supported on a suitable frame that forms an integral part thereof. Extensions 74 of the frame protrude below the floor 70 of the chamber 60 at each corner thereof. Wheels 76 are mounted to each of these extensions 74. The wheels include a locking bar 78. The wheels 76, including locking bars 78, may be of conventional design, e.g., the type of wheels commonly used on scaffolding supports.

A suitable horizontal rack 80 hangs below the floor 70 from hanger supports 82. In a preferred construction, the hanger supports 82 are made from angle iron. A horizontal support or frame 84, also made of angle iron, is welded to the lower end of each hanger support 82. The rack 80, which may be, e.g., a heavy gauge mesh screen, is then laid over and attached to the horizontal support or frame 84. The hanger supports 82, supporting the horizontal frame 84 with rack 80, thus comprise the equipment rack 24 referred to in FIG. 1. One or more vacuum pump units 86, including built-in filters, may then be conveniently placed on the rack 80. Such vacuum pump units 86 may be, e.g., the Service Vacuum Model 497, manufactured by 3M Corporation.

The construction of the work chamber 60 may be of any desired design. The materials also may be of any desired type, e.g., wood, plastic, metal, or combinations of the same. In a preferred embodiment, the frame of the chamber 60 is made from angle iron, and the walls 62–68 are galvanized sheet metal of approximately 16–22 gauge. Other materials may also be used, such as fiberglass. The entire chamber 60 is then typically coated with a suitable coating, such as a paint having a polymer base.

As seen in FIG. 3, in addition to the main wheels 76, a set of outrigger wheels 90 are attached to the side wall 66. A similar set of outrigger wheels (not visible in FIG. 3) are also attached to the side wall 68. These outrigger wheels 90 are selectively extendable to give additional stability to the work chamber 60 when a worker is working therein, particularly when the worker is standing on a scaffolding shelf near the upper part of the work chamber.

An electrical receptacle 92 is mounted to the outside of the side wall 66. A similar electrical receptacle is mounted to the inside of the side wall 66. These receptacles include a GFI circuit. Power is provided from an input power cord 93. A power cord 95 of the vacuum pump unit 86 may be engaged in the receptacle 92. An air duct 98 connects the vacuum unit 86 to the inside of the work chamber 60.

The upper end of the work chamber 60 is open. A horizontal frame 100 is telescopingly mounted to the side walls 66 and 68 by means of telescoping supports 102 and 104. A flexible sheet material 106, such as 6–10 mil thick polyethylene sheeting, is attached to the frame 100 and around the upper edge of the work chamber 60. Adjustment means 108, described more fully below, allow the frame 100 to be adjusted to any desired height above the upper edge of the walls 62–68, thereby effectively extending the walls of the work chamber 60 to a desired height.

Figures 4A, 4B, 5A:
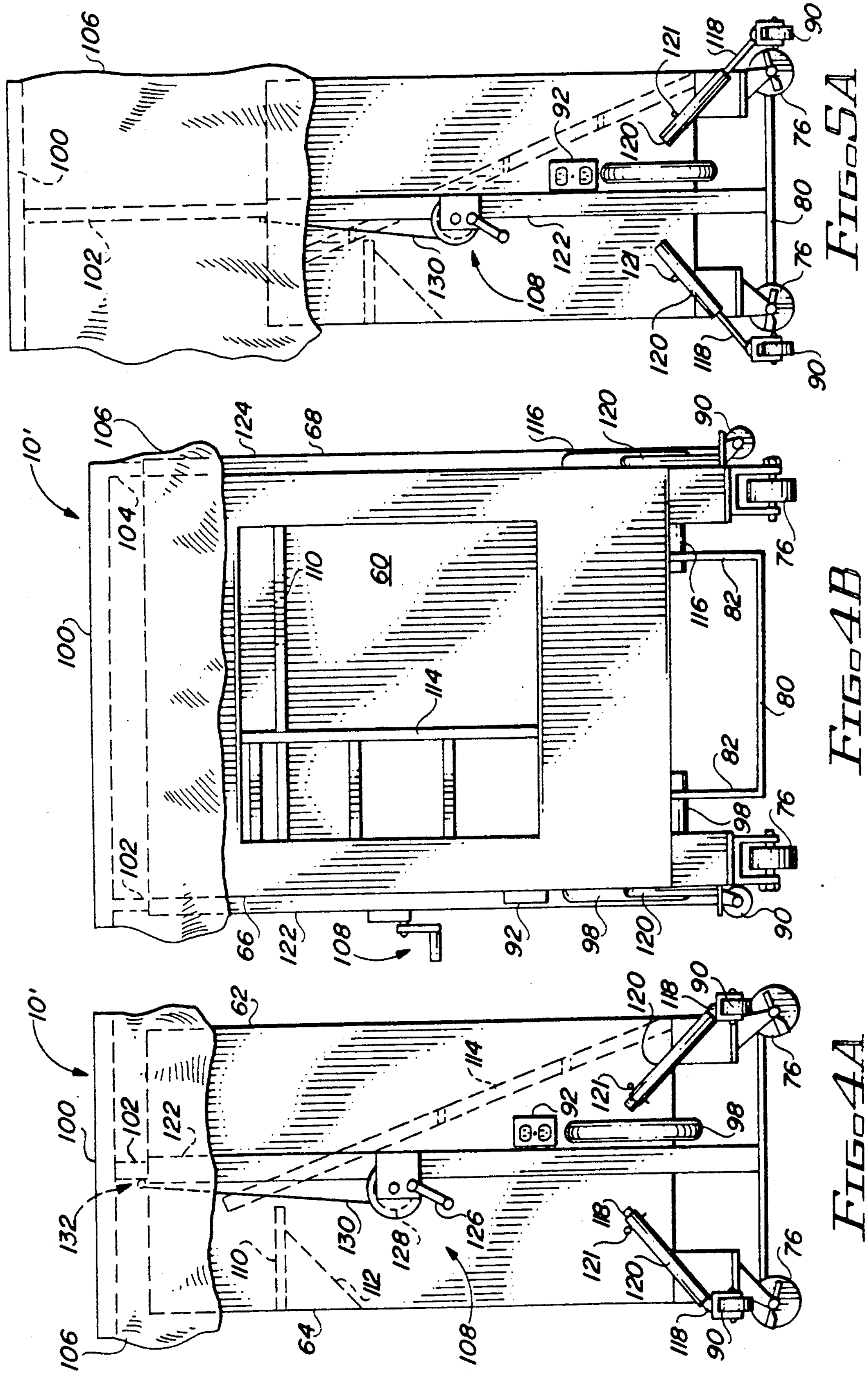
FIG. 4A is an end view of the embodiment of the invention shown in FIG. 3, showing the flexible portion of the work chamber walls in a retracted position.
FIG. 4B is a side view of the invention shown in FIG. 4A.
FIG. 5A is an end view of the embodiment of the invention shown in FIG. 3, showing the flexible portion of the work chamber walls in an extended position.

Referring next to FIGS. 4A and 4B, there is shown an end view and side view, respectively, of the embodiment of the invention shown in FIG. 3, showing the frame 100 in a lowered position. Note that the frame 100 has perimeter dimensions that are slightly larger than the perimeter of the work chamber 60. The door 72 has been removed from these views for clarity. As seen best in FIG. 4B, a shelf 110 is mounted inside of the chamber 60 so as to be against the back wall 64. The height of the shelf 110 is adjustable as desired by moving shelf support brackets 112. As desired, a ladder 114 may be placed within the work chamber 60 to facilitate climbing up to the shelf 110. As also seen in FIG. 4B, a second air duct 116 provides a means for attaching the vacuum pump units (not shown in FIGS. 4A and 4B) placed on the support rack 80 to the work chamber 60 through the side wall 68. As required, a suitable manifold is used to attach the vacuum pump units to the air duct tubes 68 and 116.

As indicated in FIG. 4A, the outrigger wheels 90 are attached to support rods 118. The support rods 118 slide within support tubes 120 attached, e.g. welded, to the side walls 66 and 68. Each of the rods 118 are held in a retracted position within the tubes 120 by a locking pin 121. The support tubes 120 are slanted at an appropriate angle so that when the rods 118 are extended therefrom, by removing the pins 121, the wheels 90 (which also include conventional locking means) make contact with the floor upon the unit 10' is placed so as to provide a much wider wheel base, thereby better stabilizing the unit and preventing it from tipping forwards or backwards. (See FIG. 5A.) The rods 120 are bent near the ends to which the outrigger wheels 90 are attached in order to allow the outrigger wheels 90 to contact the floor at an appropriate angle.

The adjustment means 108 lifts or lowers the telescoping support rods 102 and 106 within outer tubes or channels 122 and 124, mounted vertically to the walls 66 and 68. Numerous means may be used to effectuate this raising and lowering, e.g., mechanical, hydraulic, and/or electrical. As shown in FIGS. 4A and 4B (and the other figures herein), a mechanical means is used. This means includes a crank 126 attached to turn a spool 128 using a conventional gear and ratchet mechanism. As the spool 128 turns, a cable 130 is wound thereon. The cable 130 is supported by a pulley, or equivalent, near the upper edge of wall 66 at location 132. The cable then passes down through a portion of the channel 122 and attaches to the lower end of telescoping support 102. Thus, as the length of the cable 130 is shortened, by turning the crank 126, the support 102 is lifted up. This same cable, or an additional cable coupled to the spool 128, passes over to the other side of the unit 10' (typically underneath the work chamber 60) through a suitable network of pulleys and lifts or lowers the telescoping support 104 within the channel 124 at the same time that the support 102 is raised and lowered within the channel 122. The rachet mechanism coupled to the spool 128 advantageously locks the supports 102 and 106 in a desired position.

Figure 5B:
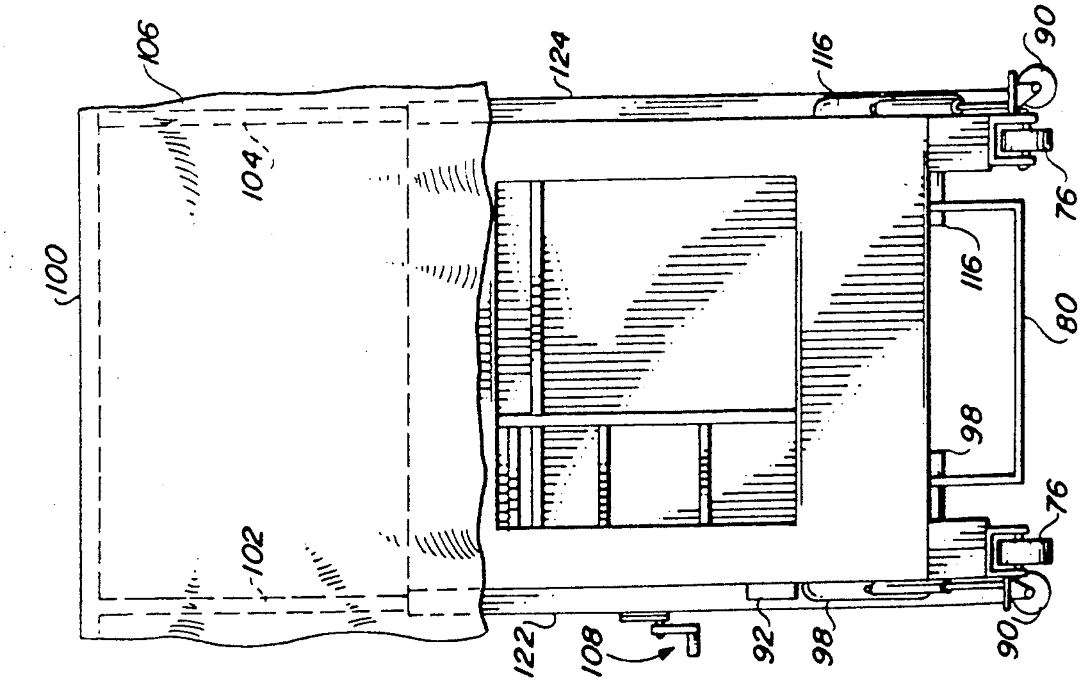
FIG. 5B is a side view of the invention shown in FIG. 5A.

FIGS. 5A and 5B are an end view and side view, respectively, of the unit 10' with the frame 110 raised to an elevated position. Also, in FIGS. 5A and 5B, the outrigger wheels 90 are extended to their supporting position. The outrigger wheels are locked in this supporting position by moving the locking pins 121 to different position along the length of support tubes 120. Otherwise, FIGS. 5A and 5B are the same as FIGS. 4A and 4B, described above.

Figure 6B:
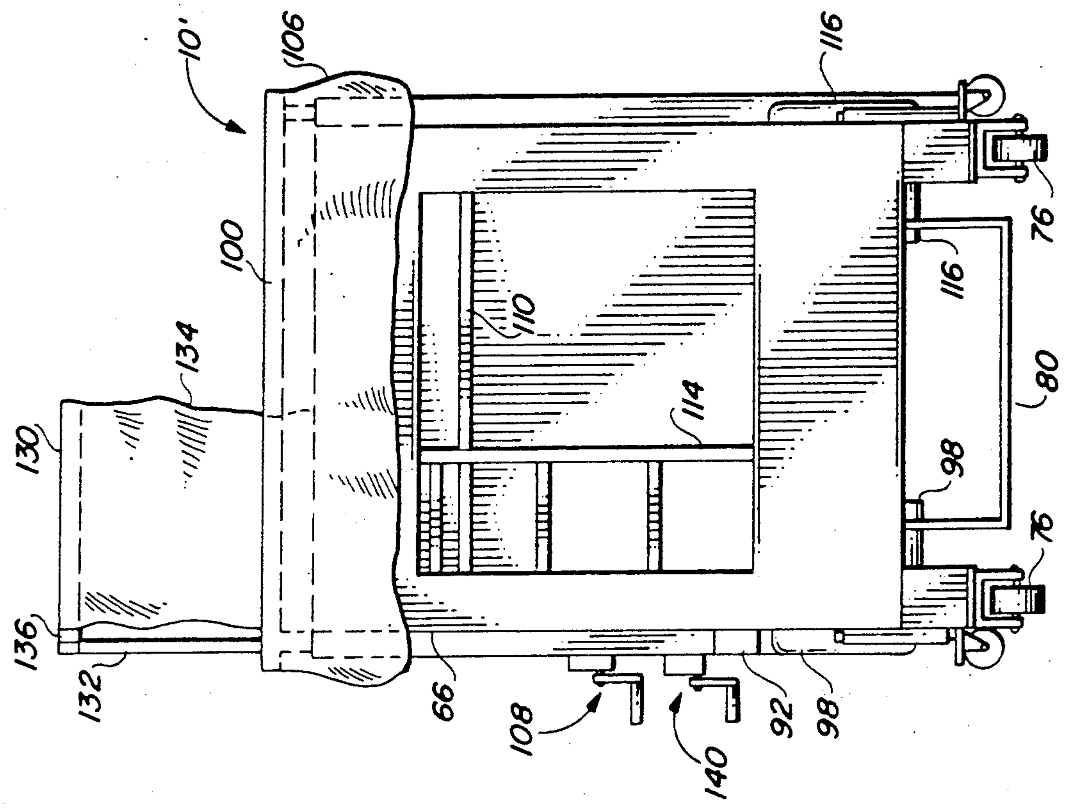
FIG. 6B is a side view of the invention shown in FIG. 6A.
Figure 6A:
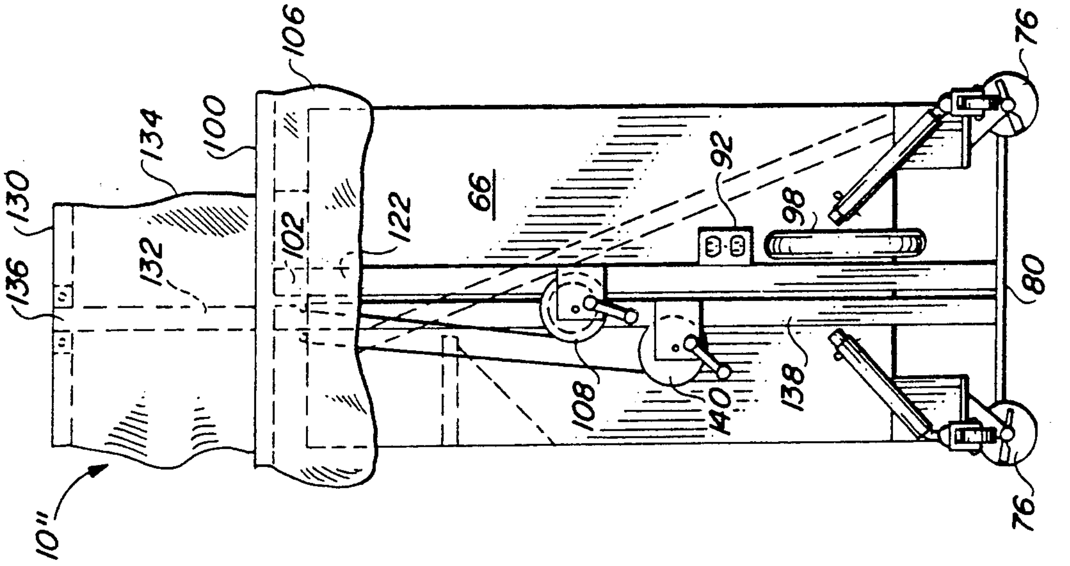
FIG. 6A is an end view of an alternative embodiment of the invention showing two adjustable sections used to extend the work chamber.

Referring next to FIGS. 6A and 6B, end and side views, respectively, of a unit 10'' are shown that feature an alternative embodiment of the present invention. For the most part, the unit 10'' shown in FIGS. 6A and 6B is the same as the unit 10' shown in FIGS. 3, 4A, 4B, 5A and 5B, and like numerals are used to refer to like parts. However, the unit 10'' shown in FIGS. 6A and 6B includes an additional frame 130 supported by a single telescoping support 132. A flexible sheet 134 is connected to the frame 130 and drapes down within the flexible sheet 106 attached to the frame 100. A bracket 136 attached to the end of telescoping support 132 holds the frame 130 inward from the support 132 and the end wall 66 so that the flexible sheet 134 hangs inside of the flexible sheet 100 hanging from the frame 100. As seen in FIGS. 6A and 6B, the frame 130 is significantly smaller than the frame 100, both with respect to its length (as seen in FIG. 6B) and its width (as seen in FIG. 6A).

The telescoping support 132 is mounted within a vertical support channel 138 attached to the end wall 66 adjacent the support channel 122. Conventional means 140, which may be the same as the means 108 previously described, are used to raise, lower, and lock the telescoping support 132.

The embodiment shown in FIGS. 6A and 6B is particularly suited for situations where the work must be performed within a protected work chamber that extends into the deck space above a false ceiling. Advantageously, both frames 130 and 100 may be lowered as required in order to allow the unit to readily fit through doors or into elevators. Further, for situations where the upper portion of the work chamber is not needed, the frame 130 may be readily removed by simply detaching it at the bracket 136, thereby effectively converting the unit 10'' (shown in FIGS. 6A and 6B) to the unit 10' shown in FIGS. 2–4.

The flexible sheet material 106 and 134 that is hung from the frames 100 and 130 and connected to the upper walls of the chamber 60 or elsewhere, may be readily replaced as required. Typically, this flexible sheet material is attached to the frames 100 and 130, as well as to the walls of the chamber 60, using duct tape, or equivalent. As previously indicated, this flexible sheet material may be realized using 6–10 mil thick polyethylene sheeting.

As an alternative or addition to the embodiment of FIGS. 6A and 6B, and as an addition to the embodiment shown in FIGS. 3–5B, a hand-held collection bag 144, as shown in FIG. 7 may be used. The bag 144 includes a hoop 146 to which a bag made of flexible sheet material 148, such as 10 mil thick polyethylene sheeting, has been attached. Such attachment may be realized using conventional duct tape. A slit is made near the bottom of the bag 144 and the nozzle or tip 29 of the vacuum hose 28 is inserted therein. Duct tape may again be used to securely attach and seal the vacuum hose to the bag 144.

Assuming that the hoop 146 is maintained in a substantially horizontal plane, a generally vertical support 150 is welded to the hoop 146. This support 150 has a protruding handle 150 attached along its length, near the upper end thereof, and an arm plate 152 attached to its lower end. Typically, the support 150 includes a slight bend, of approximately 30°, immediately below a lower edge of the hoop 146. In a preferred embodiment, the hoop 146 has a diameter of about 20 inches, the support 150 protrudes about 12–14 inches below the hoop 146, and the bag has an overall length of about 4 feet. The collection bag is advantageously made from light-weight materials, such as aluminum. In a preferred embodiment, stainless steel rings are secured to the upper and lower edges of the hoop 146 in order to provide desired rigidity.

In use, the worker simply grasps the handle 154 with, e.g., his left hand, and rests the arm plate 152 against his left forearm. He then manually positions the bag 144 in a desired position beneath a work site, while performing whatever work is required using his right hand. Any debris dislodged while performing such work falls into the bag 144. Any particles that become loosened during such work. are pulled into the bag 144 by the negative air pressure that is established therein by the vacuum hose 28. As needed, the flexible bag material 148 may be removed and discarded, and a new bag may be taped to the hoop 146.

As described herein, it is thus seen that the present invention provides spot abatement apparatus that is portable and easy to move from one location to another. Such apparatus advantageously fits through conventional door openings, thereby avoiding the necessity to disassemble the apparatus when moving it from one work location to another. Additionally, such apparatus is totally self-contained, and includes all the tools and components needed to safely perform spot abatement of asbestos, or a similar material, from within the work chamber of the apparatus. The filtration and pump units needed to establish a negative air pressure within the work chamber are carried on the apparatus. Further, ground-fault interrupt (GFI) electrical plugs are conveniently located both within and without the work chamber, thereby allowing various electrical tools to be easily powered for use by personnel both within and without of the unit.

As also described herein, it is seen that the portable apparatus of the invention includes adjustment means for selectively adjusting the height of the work chamber walls, thereby facilitating the establishment of a sealed work chamber below a desired work site on or in a ceiling space, regardless of the floor-to-ceiling height. As also seen, one embodiment of the invention advantageously includes means for two separate telescoping extensions of the work chamber walls, thereby allowing a first extension up to a first ceiling, such as a false ceiling, and a second extension up above the false ceiling into a deck space region where the desired work is performed.

Further, it is seen from the above description that the invention provides an efficient system and method for the spot abatement of asbestos or similar materials. Such system and method may advantageously be performed with minimum disruption to the structure where the desired work is performed, and with minimum disruption and/or displacement of the personnel who are housed within such structure. Thus, for example, the invention may readily be used to remodel a structure having asbestos material, or to retrofit or repair various systems (such as sprinkler systems) within such structure.

While the invention herein disclosed has been described by means of specific embodiments and applications thereof, numerous modifications and variations could be made thereto by those skilled in the art without departing from the scope of the invention set forth in the claims.

What is claimed is:

1. Self-contained, portable, spot abatement apparatus comprising:

a work chamber having a floor, walls, and an entry door, said work chamber being sufficiently large to enable a worker to work therein;

a scaffold plank adjustably mounted within said work chamber, said scaffold plant providing a work surface upon which said worker within said work chamber may stand;

extension means for selectively extending the dimensions of said work chamber upwards towards a work area containing materials having particulate contaminants;

means for establishing a negative air pressure within said work chamber, said negative air pressure means including a plurality of vacuum pump units carried by said apparatus, a first vacuum pump unit being coupled to the inside of said chamber to create a negative air pressure therein, a second vacuum pump unit being coupled to a hose within said work chamber, said hose being sufficiently long to allow the worker within said chamber to manually sweep a nozzle of said hose to any desired position within said work chamber or the work area beneath which said apparatus is located, each of said plurality of vacuum pump units including a filter system, all of the air exiting said work chamber being forced to pass through the filter system of one of said first or second vacuum pump units;

wheels attached to said work chamber to facilitate moving said work chamber to a desired work site;

outrigger wheels attached to said work chamber near its floor for stabilizing said work chamber when a worker is working therein; and locking means for selectively locking said wheels and outrigger wheels for further stabilizing said work chamber;

whereby said apparatus may be selectively wheeled to the desired work site beneath the work area containing materials having particulate contaminants, said work chamber may be extended to effectively place the work area within said work chamber, work may be performed at the work area from inside of said work chamber while establishing a negative air pressure therein, and any particulate contaminants dislodged from the materials while performing said work are then captured in the filter system of one of said vacuum pump units.

2. The self-contained, portable spot abatement apparatus as set forth in claim 1 further including an equipment tray beneath the floor of said work chamber, said plurality of vacuum pump units being carried on said equipment tray.

3. The self-contained, portable spot abatement apparatus as set forth in claim 2 further including power distribution means carried by said work chamber, said power distribution means including means for receiving electrical input power, and means for distributing said electrical input power to an internal location inside of said work chamber and an external location outside of said work chamber, said external location providing electrical power to said plurality of vacuum pump units carried on said equipment tray, and said internal location providing electrical power to any tools that may be utilized within said work chamber.

4. The self-contained, portable spot abatement apparatus as set forth in claim 1 wherein said extension means comprises a first frame supported in a generally horizontal position above said walls by a first set of telescoping supports, said first set of telescoping supports including first adjustment means for selectively adjusting the length thereof, said first frame having flexible sheeting connected thereto, said flexible sheeting also being attached to an upper portion of said walls, whereby the height of said work chamber is selectively increased by selectively raising said first frame.

5. The self-contained, portable spot abatement apparatus as set forth in claim 4 wherein said first adjustment means includes ratchet-controlled crank means for winding a cable that pulls a first telescoping member out of a second stationary member within at least one telescoping support of said first set of telescoping supports.

6. The self-contained, portable spot abatement apparatus as set forth in claim 4 wherein said first frame has a perimeter dimension that is larger than the perimeter of the walls of said work chamber around an upper edge thereof.

7. The self-contained, portable spot abatement apparatus as set forth in claim 4 wherein said extension means further includes a second frame supported in a generally horizontal position above said walls by a second set of telescoping supports, said second set of telescoping supports including second adjustment means for selectively adjusting the length thereof, said second frame having additional flexible sheeting connected thereto, said additional flexible sheeting being sealably connected to said work chamber.

8. The self-contained, portable spot abatement apparatus as set forth in claim 7 wherein said first adjustment means includes first ratchet-controlled crank means for winding a cable that pulls a telescoping member out of a stationary member within at least one telescoping support of said first set of telescoping supports, and wherein said second adjustment means includes second ratchet-controlled crank means for winding a cable that pulls a telescoping member out of a stationary member within at least one telescoping support of said second set of telescoping supports.

9. The self-contained, portable spot abatement apparatus as set forth in claim 7 wherein said first frame has a perimeter dimension that is larger than the perimeter of the walls of said work chamber around an upper edge thereof; and said second frame has a perimeter dimension that is smaller than the perimeter dimension of said first frame.

10. The self-contained, portable spot abatement apparatus as set forth in claim 9 wherein said second adjustment means positions said second frame above said first frame.

11. The self-contained, portable spot abatement apparatus as set forth in claim 4 further including drain means mounted in the floor of said work chamber for facilitating cleaning of said work chamber.

12. The self-contained, portable spot abatement apparatus as set forth in claim 4 further including a handheld collection bag attached to said means for establishing a negative air pressure within said work chamber, whereby a negative air pressure is established within said collection bag.

* * * * *